United States Patent Office 2,751,407
Patented June 19, 1956

2,751,407

PURIFICATION OF 1,4-DICYANO-2-BUTENE ISOMERIC MIXTURES

Samuel P. Foster, Wilmington, and Gelu S. Stamatoff, Newark, Del., assignors to E. I. du Pont de Nemours and Company, Wilmington, Del., a corporation of Delaware No Drawing. Application June 17, 1953,
Serial No. 362,418

3 Claims. (Cl. 260—465.8)

This invention relates to a process for preventing corrosion of metals by mixtures of 1,4-dicyano-2-butene isomers which are contaminated with small amounts of chlorine-containing impurities.

For several years it has been known that 1,4-dicyano-2-butene is obtained by cyanation of 1,4-dichlorobutenes, e. g. by the method of U. S. 2,342,101 or by the more recently disclosed cyanation processes involving reaction between 1,4-dichlorobutenes and HCN in the presence of aqueous hydrochloric acid and a dissolved copper catalyst (U. S. P. 2,477,617, 2,477,672 and 2,477,674). The crude products obtained in the latter processes have been contaminated with small amounts of 1,4-dichlorobutenes. By careful distillation of the crude products thus obtained, it has been possible to prepare relatively pure crystalline 1,4-dicyano-2-butene which is virtually free of 1,4-dichlorobutenes. The highly selective fractionation required in this distillation process is quite costly, not only because it requires an efficient fractionating column, and yields a normally solid product, but more particularly because the mixture is highly corrosive to mild or stainless steels.

In the Langkammerer patent, U. S. 2,478,285, it was disclosed that 1,4-dicyano-2-butene could be isomerized to a liquid isomer, namely, 1,4-dicyano-1-butene, by heating a mixture of 1,4-dicyano-2-butene and an amine having a pKa value at 20°–25° C. between 6 and 12. The quantity of amine generally employed according to the Langkammerer process was between 0.8 and 2% of the weight of 1,4-dicyano-2-butene. To obtain a product which is liquid at relatively low temperatures and which is non-corrosive, Grigsby and Bloom (U. S. 2,570,794) have recently devised a process for removal of specific chlorine-containing compounds which cause corrosion (especially 1,4-dichlorobutene). In the Grigsby and Bloom process the crude nitrile, contaminated with the chlorine-containing impurities, was treated with an amine of the class consisting of trimethyl and triethylamine at a temperature of from 90° to 180° C. in the liquid phase, whereby the amine reacted with the chlorine-containing impurity to produce a water-soluble product which could be extracted from the resulting mixture. The Grigsby and Bloom process produced a non-corrosive product containing small traces of methylamine or triethylamine, but no free HCl. These trace amounts of tertiary amine, it has now been found, were highly beneficial, because they assisted in preventing corrosion of mild or stainless steel by trace amounts of hydrogen chloride precursors still remaining in the purified nitrile.

While as explained above the Grigsby and Bloom process was highly efficient from the standpoint of preventing corrosion and while it provided an excellent method for converting the solid dicyanobutene to a liquid isomer which could be handled more readily, it nevertheless had certain disadvantages. The chief disadvantage was, of course, the need for employing substantial amounts of a tertiary amine having a highly offensive odor. In large scale operations, this tertiary amine odor became particularly troublesome, not only because it was very difficult to suppress about the plant but also because under certain special conditions it gave rise to a potential air pollution problem in near-by communities.

The objective of eliminating the use of trimethylamine or triethylamine was a particularly difficult one to achieve, and repeated efforts to produce the desired isomerization reaction, and purification, with other alkaline materials, resulted in failures. Methods which had previously been reported to be effective in the allylic rearrangement of other unsaturated nitriles were found to be unsatisfactory when applied in the purification and isomerization of 1,4-dicyano-2-butene. It had been known, for example, that 2-alkenyl cyanides could be isomerized to 1-alkenyl cyanides by contacting the 2-alkenyl cyanide in the vapor phase with an alkali or alkaline earth metal cyanide at a temperature of approximately 200° to 540° C. Because of the ease with which 1,4-dicyano-2-butene is converted to tarry products in the presence of alkaline reagents, especially at elevated temperatures, this previously known isomerization process could not be employed effectively in the manufacture of liquid isomers from 1,4-dicyano-2-butene. Repeated efforts to employ caustic solutions were ineffective for similar reasons. However, in copending application S. N. 362,309, now U. S. Patent 2,695,912, a process was disclosed whereby crude 1,4-dicyano-2-butene, contaminated with corrosive chlorine-containing impurities was converted by aqueous sodium hydroxide to a mixture of isomers which remained liquid at relatively low temperatures, and which had a greatly reduced content of the chlorine-containing impurities. According to the process of the said copending application S. N. 362,309, now U. S. Patent 2,695,912, isomerization of 1,4-dicyano-2-butene to a mixture of isomers including trans-1,4-dicyano-2-butene and cis-1,4-dicyano-1-butene was effected satisfactorily by treating a solution of crude 1,4-dicyano-2-butene in an inert organic solvent with a controlled quantity of aqueous alkali metal hydroxide, sufficient to maintain the pH of the water phase, measured after separation from the agitated mixture, at 10.5 to 12.0, whereby the readily hydrolyzable chlorine-containing compounds were hydrolyzed, and thereafter adding a further controlled amount of aqueous sodium hydroxide, in quantity equal to from 0.3% to 5.0% of the weight of dicyanobutene, and heating the mixture under carefully controlled conditions to produce the desired isomerization.

In carrying out the latter process the crude dicyanobutene, contaminated with chlorine-containing impurities was first treated, as hereinabove noted, by addition of caustic in sufficient quantity to remove the most reactive chlorine-containing impurities. The chlorine removal reaction was extremely rapid, but nevertheless in this step of the process it was desirable to provide sufficient agitation to produce good contact of the caustic with the organic phase, while periodically or continuously observing the pH of the aqueous phase of the reaction mixture. The purpose of this preliminary caustic wash was to convert the most readily hydrolyzable chlorine-containing contaminants to hydrolysis products, thereby removing contaminants at a pH just below that which causes isomerization. This preconditioned the mixture for the isomerization step, which followed the above-identified preliminary caustic wash, and which fixed the quantity of alkali required in the isomerization step. The quantity of alkali required was the smallest amount which was sufficient to produce the isomerization, and this was just below the quantity which produced excessive losses of dicyanobutene to degradation products. There was thus a narrow range of alkali content which could be employed effectively, and this was possible only when the mixture was preconditioned as above described. In general the isomerization was continued until the melting point of the dicyanobutene was lowered to within the range of 2° to 8° C. In nearly all instances the time required was within the range of about 5 to 30 minutes. The relative amounts of water and inert organic medium in the reaction system are not particularly critical, and each may be varied rather widely. The degree of agitation was a variable which did not have to be controlled quantitatively, it being necessary however to provide sufficient agitation for ample contact between the aqueous and non-aqueous phases.

As indicated above, neither the preliminary caustic wash nor the isomerization step resulted in complete removal of chlorine-containing impurities. Therefore the product obtained by applying the above-described process to the crude dicyanobutene was still corrosive to mild and stainless steels. It was a product of great utility, however, for reasons which will now be explained.

The dicyanobutene, treated as above described, was not only isomerized to the desired form and freed of particular chlorine-containing contaminants, but what is more important, it was in a state of purity such that it could be rendered non-corrosive by the method of the present invention.

It has been discovered, according to the present invention that olefin oxides of the class consisting of ethylene oxide and propylene oxide react with the organic chlorides remaining in the mixture of isomers in the process hereinabove described, or with any HCl produced therefrom, to eliminate the corrosiveness to mild and stainless steels which otherwise characterizes the contaminated dicyanobutenes.

Because of these respective discoveries, it has become possible to provide an overall process for purifying 1,4-dicyano-2-butene and eliminating difficulties in the hydrogenation thereof (e. g. by the process of U. S. Patent 2,532,212) which involves isomerizing the crude 1,4-dicyano-2-butene, contaminated with chlorine-containing impurities which are formed in, or are the result of, the synthesis of the said 1,4-dicyano-2-butene from dichlorobutene and HCN, to produce a liquid mixture of isomers of 1,4-dicyano-2-butene and 1,4-dicyano-1-butene having a melting point within the range of 2° to 8° C., by agitating a solution of the said crude 1,4-dicyano-2-butene in an inert organic liquid with a quantity of aqueous alkali metal hydroxide sufficient to produce a pH of 10.5 to 12.0, and further admixing the dicyanobutene thus produced, dissolved in an inert organic liquid with from 0.3% to 5% of its weight of alkali metal hydroxide in aqueous solution, agitating the resulting mixture for a period of time within the range of 5 to 30 minutes at a temperature within the range of 50° to 70° C. until the resulting isomerization of the 1,4-dicyano-2-butene has proceeded to such an extent that the melting point of the mixed isomers thus formed is within the range of 2° to 8° C., withdrawing from the aqueous phase in the resulting mixture the non-aqueous phase comprising a solution of the said mixed isomers in the said inert organic liquid, and subjecting the dicyanobutene in the said mixture to the action of ethylene or propylene oxide, whereby the dicyanobutene is made non-corrosive to stainless steel.

In the process just defined the initial treatment with aqueous alkali metal hydroxide to produce a pH of from 10.5 to 12.0 (in the water phase after removal) may be performed at a temperature within the range of 0° to +70° C. (or somewhat lower, not however below the freezing point of the aqueous phase). The alkali metal hydroxide which is employed in the initial treatment and also in the isomerization step may be sodium hydroxide, potassium hydroxide, lithium hydroxide, but sodium hydroxide is generally preferred.

Without the final olefin oxide treatment the crude dicyanobutene is somewhat corrosive to steel (mild or stainless). This is shown by the following data, comparing the rate of corrosion of stainless steel by a low-boiling fraction of the crude (everything that distilled from 90° C./atm., up to 150° C., at 100 mm.) with the corresponding rate of corrosion of stainless steel by a similar fraction obtained in the trimethylamine process previously mentioned.

*Corrosivity of the low-boiling fraction of crude dicyanobutene*

|  | NaOH Process,[1] mils/yr. | Triethylamine Process |
| --- | --- | --- |
| Laboratory Test (48 hrs., 8 g. strip) | 95 | Nil. |
| During semiworks run (100 hrs., 11 g. strip) | 17 | Nil. |

[1] Without olefin oxide treatment.

The final olefin oxide treatment reduces to nullity the rate of corrosion of stainless steel by low-boiling fraction of dicyanobutene, prepared by the NaOH process just described. One of the preferred methods for bringing the dicyanobutene into contact with ethylene or propylene oxide is to distil the dicyanobutene in a column containing ethylene or propylene oxide. A slow stream of the olefin oxide can be continuously introduced at the base of the column, and conducted through the column and condenser. The total quantity of olefin oxide introduced in this manner is preferably from about 500 to about 20,000 parts per million parts of dicyanobutene distilled. When the olefin oxide is ethylene oxide it is desirable to inject a part of the gas stream at a succession of points in the distillation equipment.

The invention is illustrated further by means of the following example.

EXAMPLE

A solution of dicyanobutene (produced by reaction between dichlorobutene and hydrogen cyanide in the presence of aqueous hydrochloric acid and a copper chloride catalyst) in benzene, having a dicyanobutene content of 34% by weight, was introduced into a 1 liter glass reaction vessel which was equipped with a glass stirrer and heated by means of a 250 watt infra red lamp. The mixture was titrated with 10% sodium hydroxide solution at 60° C. The pH reading of the mixture was followed by means of a pH meter equipped with a calomel electrode and a glass electrode, and in addition pH tests were made on withdrawn samples from which the organic phase had been removed. The pH reading was initially 3.0 and rose rapidly upon addition of the sodium hydroxide solution to approximately 8. Here a small inflection point was encountered. Further addition of aqueous sodium hydroxide resulted in a gradual rise to a pH reading of 10, at which time a sharp inflection occurred raising the pH reading to 11.5. At the latter stage the pH of the aqueous phase after separation from the non-aqueous phase was 12.0. The quantity of sodium hydroxide consumed was equivalent to 0.271 g. of chlorine per 100 g. of dicyanobutene-benzene solution. Direct titration of the water layer with silver nitrate solution showed the presence of 0.268 g. of chlorine in the aqueous phase per 100 g. of dicyanobutene-benzene solution employed. In a series of experiments similar titrations were performed with a series of dicyanobutene-benzene solutions from various specimens of dicyanobutene produced by reaction between dichlorobutene and hydrogen cyanide in the presence of aqueous hydrochloric acid, and the inflection point for chlorine removal when the pH was measured on the aqueous phase from which the organic phase had been separated was always within the range of 10.5 to 12.0. From a sample of the resulting product the dicyanobutene-benzene solution was removed and charged into a reaction vessel having a capacity of 1 liter. This vessel was fully baffled and was equipped with a stirring device capable of providing agitation equivalent to about 2.5 horsepower per 1000 gal. The mixture which contained in solution the solid form of dicyanobutene, was heated to 70° C. in this vessel with about 15% by weight of water added, and 19.5 ml. of 10% sodium hydroxide aqueous solution which had been preheated to 70° C. was introduced. After 24 minutes of most vigorous agitation, the product was removed, washed with water, and distilled for removal of benzene. The resulting mixture of isomers remained liquid when cooled to a temperature within the range of 2 to 8° C. Distillation of the mixture in a stainless steel still through which a slow stream of nitrogen containing 5% by weight of ethylene oxide was passed, produced no corrosion of the stainless steel distillation equipment.

It is to be understood that the foregoing example is illustrative only and that numerous embodiments of the invention will occur to those who are skilled in the art.

We claim:

1. A process for producing from crude 1,4-dicyano-2-butene, contaminated with chlorine-containing impurities which are corrosive to mild and stainless steel, and which are present as a result of the process employed for manufacture of the said 1,4-dicyano-2-butene, namely its synthesis from dichlorobutene and HCN, a liquid mixture of isomers of 1,4-dicyano-2-butene and 1,4-dicyano-1-butene having a melting point within the range of 2° to 8° C., which comprises agitating a solution of the said crude 1,4-dicyano-2-butene in an inert organic liquid with a quantity of aqueous alkali metal hydroxide sufficient to produce a pH of from 10.5 to 12.0, in the water phase after separation from the organic phase, and further admixing the dicyanobutene thus produced, dissolved in an inert organic liquid, with from 0.3% to 5% of its weight of alkali metal hydroxide in aqueous solution, agitating the resulting mixture for a period of time within the range of 5 to 30 minutes at a temperature within the range of 50° to 70° C. until the resulting isomerization of the 1,4-dicyano-2-butene has proceeded to such an extent that the melting point of the mixed isomers thus formed is within the range of 2° to 8° C., withdrawing from the aqueous phase in the resulting mixture the nonaqueous phase comprising a solution of the said mixed isomers in the said inert organic liquid, and distilling the resulting mixture in the presence of an olefin oxide of the class consisting of ethylene oxide and propylene oxide in a stainless steel vessel, whereby corrosion of the said steel is avoided, and a distillate fraction containing the said mixed isomers is obtained.

2. Process of claim 1 wherein the said agitation with aqueous alkali metal hydroxide to produce a pH of from 10.5 to 12.0 in the water phase after separation from the organic phase is performed at a temperature within the range of 0° to +70° C.

3. Process of claim 1 wherein the said alkali metal hydroxide employed in producing the said pH, is sodium hydroxide, and wherein the alkali metal hydroxide present in the isomerization step is also sodium hydroxide.

References Cited in the file of this patent

UNITED STATES PATENTS

| | | |
|---|---|---|
| 2,451,386 | Hager | Oct. 12, 1948 |
| 2,478,285 | Langkammerer | Aug. 9, 1949 |
| 2,531,829 | Seymour | Nov. 28, 1950 |
| 2,570,794 | Grigsby et al. | Oct. 9, 1951 |

FOREIGN PATENTS

| | | |
|---|---|---|
| 418,230 | Great Britain | Oct. 22, 1934 |